J. RIAL & W. C. HODDE.
LAWN TRIMMER.
APPLICATION FILED OCT. 16, 1916.

1,222,031.

Patented Apr. 10, 1917.

INVENTORS
John Rial
William C. Hodde
BY
Hardway & Cathy
ATTORNEYS.

UNITED STATES PATENT OFFICE.

JOHN RIAL AND WILLIAM C. HODDE, OF BRENHAM, TEXAS.

LAWN-TRIMMER.

1,222,031.  Specification of Letters Patent.  Patented Apr. 10, 1917.

Application filed October 16, 1916. Serial No. 125,857.

*To all whom it may concern:*

Be it known that we, JOHN RIAL and WILLIAM C. HODDE, citizens of the United States, residing at Brenham, in the county of Washington and State of Texas, have invented certain new and useful Improvements in Lawn-Trimmers, of which the following is a specification.

This invention relates to new and useful improvements in a lawn trimmer.

The object of the invention is to provide a device of the character described whereby the margins of a lawn adjacent side walks or curbing may be trimmed.

A further feature of the invention resides in the provision of a device of the character described by means of which said margins may be trimmed and dressed uniformly.

With the above and other objects in view, the invention has particular relation to certain novel features of construction, operation and arrangement of parts, an example of which is given in this specification and illustrated in the accompanying drawings wherein:—

Figure 1:
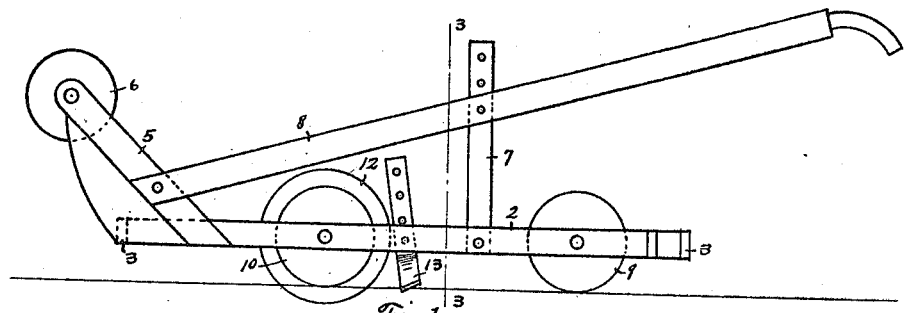
Figure 1 is a side elevation of the device.
Figure 2:
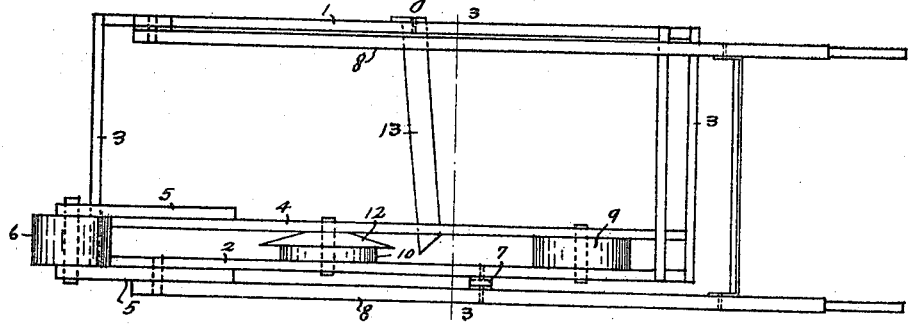
Fig. 2 is a plan view thereof.

Referring now more particularly to the drawings wherein like numerals of reference designate similar parts in each of the figures, the numerals 1 and 2 refer respectively to the side members of the frame which are connected by the end members 3, 3, said frame usually being formed of metal and preferably being rectangular in form although that particular form is not essential. Spaced from the side member 2 is a lengthwise bar 4 whose ends are secured to the respective end members 3. Secured to the side member 2 and the bar 4 respectively, near their front ends are the bearing members 5, 5, which incline forwardly and between the free ends of which is mounted a comparatively heavy roller 6 the purpose of which will hereinafter be set forth.

Secured to and upstanding from the respective side members 1 and 2 are the standards 7, 7, and handles 8, 8 are provided whose forward ends are pivoted to the front end of the side member 1 and the bearing member 5, respectively, said handles being adjustably secured to the corresponding standards 7. Rotatably mounted in suitable bearings between the side member 2 and the bar 4 are the supporting rollers 9 and 10 which are provided to support the device and to travel along the edge of the curbing or walk 11. Secured to the inner side of the roller 10 is a disk 12 somewhat larger in diameter than the roller 10, said disk being beveled so that its margin forms a continuous sharp cutting edge.

Adjustably secured to the side member 1 is a cutting blade 13 whose free end is formed into a sharp cutting edge, said blade declining from its point of anchorage and extending across to the plane of the disk 12 and following said disk.

Figure 3:
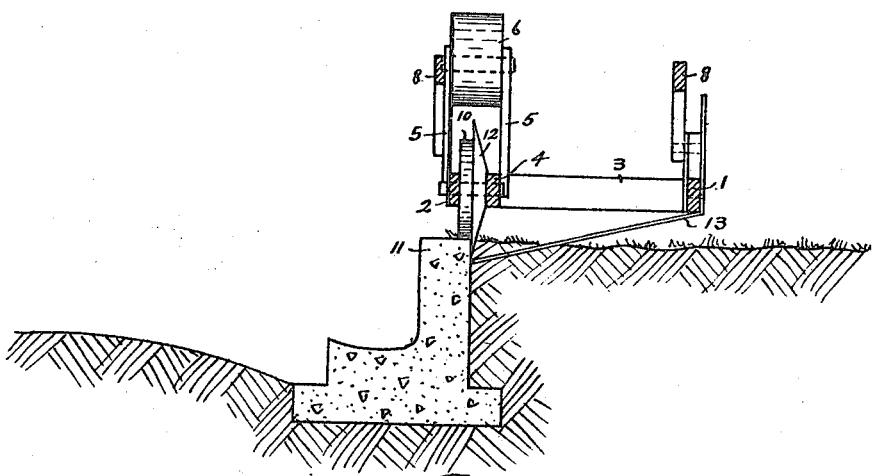
Fig. 3 is a transverse sectional view thereof taken on the lines 3—3 of Figs. 1 and 2.

The device is designed to be manually propelled, the supporting rollers 9 and 10 moving along the edge of the curbing or walk 11 and the disk 12 cutting the grass and sod and severing it from the curb or walk. The free end of the blade 13 follows along after said disk and completely severs the margin of the lawn from the surface leaving the same free to be removed and giving to the margin of the lawn adjoining the curb or walk, a uniform finish. As shown in Figs. 1 and 3, the blade 13 may be vertically adjusted so as to readily control the depth of the cut thereof.

The roller 6 is of metal having considerable weight so as to hold the device firmly on the curb or walk and when it is desired to move the device from place to place, it may be inverted and transported on this roller.

What we claim is:

A device of the character described including a frame composed of side and end members, bearing members upstanding from the front end of the frame, a roller mounted between said bearing members, support rollers mounted upon one of said side members, a cutting disk carried by one of said rollers, a cutting blade secured to the opposite side member and being vertically adjustable and whose free end is formed into a cutting edge said blade declining from its point of anchorage and extending across to the plane of the cutting disk and following said disk.

In testimony whereof we have signed our names to this specification in the presence of two subscribing witnesses.

JOHN RIAL.
WILLIAM C. HODDE.

Witnesses:
WM. WENDT,
W. E. HOTING.

Copies of this patent may be obtained for five cents each, by addressing the "Commissioner of Patents, Washington, D. C."